United States Patent [19]

Hayakawa et al.

[11] Patent Number: 5,710,201
[45] Date of Patent: Jan. 20, 1998

[54] PAINT COMPOSITION

[75] Inventors: Takeshi Hayakawa; Kishio Shibato, both of Kanagawa-ken, Japan

[73] Assignee: BASF Corporation, Southfield, Mich.

[21] Appl. No.: 379,553

[22] PCT Filed: Aug. 3, 1993

[86] PCT No.: PCT/EP93/02065

§ 371 Date: Mar. 8, 1995

§ 102(e) Date: Mar. 8, 1995

[87] PCT Pub. No.: WO94/03547

PCT Pub. Date: Feb. 17, 1994

[30] Foreign Application Priority Data

Aug. 7, 1992 [JP] Japan ..................... 4-232809

[51] Int. Cl.$^6$ .................. C08G 18/62; C09D 143/04
[52] U.S. Cl. .................. 524/269; 525/100; 525/101
[58] Field of Search .................. 525/100; 524/269

[56] References Cited

U.S. PATENT DOCUMENTS 5,066,720  11/1991  Ohsugi et al. .................. 525/100
5,087,286   2/1992  Fukuda .................. 106/287.16
5,393,817   2/1995  Deckers .................. 524/269

FOREIGN PATENT DOCUMENTS 449613  10/1991  European Pat. Off. .
58-089641  5/1983  Japan .

OTHER PUBLICATIONS

Derwent, Chemical Patents Index, Plastics, Polymers, 26 Sep. 1990, 1–2.

*Primary Examiner*—Ralph H. Dean
*Attorney, Agent, or Firm*—Anne Gerry Sabourin

[57] ABSTRACT

Paint compositions containing (A) a vinyl type copolymer obtained by polymerizing (i) specific silicone type vinyl monomers 1–50% by weight, (ii) vinyl monomers containing hydroxyl groups 5–60% by weight, and (iii) other vinyl monomers 5–80% by weight, (B) specific hydroxyl-group-containing silicone type compounds, and (C) a hardening agent that allows reaction with hydroxyl groups.

Paint films can be formed which have excellent water-repellence and oil-repellence, and in which there is no lowering of water-repellence or oil-repellence when they are exposed for long periods in natural environments.

3 Claims, No Drawings

PAINT COMPOSITION

The present invention relates to novel paint compositions, and more specifically to paint compositions which allow paint films to be formed which have excellent water-repellence and oil repellence, and in which there is no decrease in water-repellence or oil-repellence even when exposed for a long period in a natural environment.

Methods for conferring water-repellence and oil-repellence on paint by adding polysiloxane compounds have been generally known for a long time. This is because polysiloxane compounds have a low surface tension, and because they do not show phase solubility with usual paint resins the said polysiloxane compounds float to the top during the process of the drying of the paint film and form a layer of low surface energy. However, simple addition to paint resins of polysiloxane compounds alone, as is conventional, produces the problem that the low-surface-energy layer that forms on the paint film surface is prone to deciduation, and there is no escaping from a loss of water repellence and oil repellence with time. And the addition of large quantities of the said polysiloxane compounds to paint in order to suppress this decrease in water repellence and oil repellence with time also produces problems in that, because polysiloxane compounds have weak phase solubility with paint resins, it is difficult to obtain a uniform paint film.

The purpose of the present invention is to offer paint compositions which allow paint films to be formed which have excellent water-repellence and oil-repellence, and in which there is no decrease in water-repellence or oil-repellence even when exposed for a long period in a natural environment.

As the result of concerted research aimed at developing paints with the preferred qualities described above, the present inventors discovered that this purpose could be achieved with compositions containing vinyl type copolymers possessing a specific structure having a hydroxyl group and a polysiloxane moiety, and polysiloxane compounds possessing a specific structure having a hydroxyl group, and a hardening agent which allows reaction with hydroxyl groups; and we perfected the present invention on the basis of this information. Thus, the present invention offers paint compositions comprising (A) a vinyl type copolymer obtained by polymerizing (i) a silicone type vinyl monomer represented by the general formula

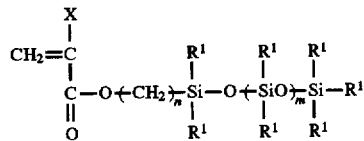

[1]

(in the formula X is a hydrogen atom or a methyl group, $R^1$ is a methyl group or a phenyl group, k is a number 1–5, and m is a number 3–150)

1–50% by weight, (ii) a vinyl monomer containing a hydroxyl group 5–60% by weight, and (iii) another vinyl monomer 5–80% by weight, (B) a silicone compound represented by the general formula

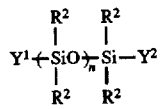

[2]

(in the equation either one of $y^1$ and $y^2$ is a hydroxyl group and the remaining one is a hydroxyl group or a methyl group; $R^2$ is a methyl group or a phenyl group, and n is a number 3–150), and (C) a hardening agent which allows reaction with hydroxyl groups.

Below, the present invention will be discussed in detail.

Because paint compositions of the present invention use in the main resin silicone type compounds having a polysiloxane moiety and a hydroxyl group, both components, namely the vinyl type copolymer component (A) and the silicone type compound component (B) show good phase-solubility, and a large quantity of the said component (B) can be used. And, because the vinyl type copolymer of component (A) and the silicone type compound of component (B) are also 3-dimensionally cross-linked by reaction with the hardening agent of component (C), the silicone compound can be fixed in the paint resin by chemical bonding, and there is no decrease in water-repellence or oil-repellence even when the cured paint film is exposed for a long period in a natural environment.

As component (A) in compositions of the present invention, a copolymer obtained by normal free radical polymerization of (i) a silicone type vinyl monomer represented by the general formula

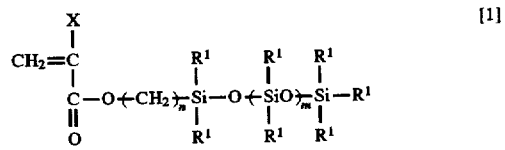

[1]

(in the equation, X, $R^1$, k and m have the same meanings as previously)

1–50% by weight, (ii) a vinyl monomer having a hydroxyl group 5–60% by weight, and (iii) another vinyl monomer 5–80% by weight is used.

Silicone type vinyl monomers represented by general formula [1] of aforementioned starting material component (i) are available, for example, as "Sairapurén" FM0711, ditto FM0721 and ditto FM0725 (all trade names of Chisso KK), etc. If this starting material component (i) is employed in a quantity less than 1% by weight, phase solubility of the vinyl type copolymer and the silicone type compound of component (B) is decreased and the appearance of the cured paint film is worsened; and if the quantity exceeds 50% by weight, it is difficult to obtain a cured paint film of adequate hardness.

Examples of vinyl monomers containing hydroxyl groups for starting material component (ii) include 2-hydroxy-ethyl (meth)acrylate, 2-hydroxypropyl (meth)acrylate, 4-hydroxybutyl (meth)acrylate, glyceryl (meth)acrylate, 3-hydroxybutyl (meth)acrylate, di(2-hydroxyethyl) fumarate, (mono-2-hydroxyethyl-monobutyl) fumarate, polypropylene glycol or polyethylene glycol mono(meth) acrylate, and "Purakuseru" FM and FA monomers (Daicel Chemical KK trade name; vinyl monomers with added caprolactone), etc.

If these vinyl monomers containing hydroxyl groups are employed in quantities of less than 5% by weight, the solvent resistance of the hardened film is decreased, and if the quantity exceeds 60% by weight, a tendency towards decreased flexibility is seen in the hardened paint film.

Moreover, examples of other vinyl monomers for starting material component (iii) include styrene, -methyl-styrene, p-t-butylstyrene, vinyltoluene, methyl (meth)-acrylate, ethyl (meth)acrylate, n-propyl (meth)-acrylate, isopropyl (meth) acrylate, n-butyl (meth)-acrylate, isobutyl (meth)acrylate, t-butyl (meth)-acrylate, 2-ethylhexyl (meth)acrylate, lauryl (meth)-acrylate, cyclohexyl (meth)acrylate, benzyl (meth)-acrylate, isobornyl (meth)acrylate, alkoxyalkyl (meth)-acrylate, acrylic acid, methacrylic acid, maleic acid, fumaric acid, maleic acid esters, fumaric acid esters, vinyl acetate, vinyl benzoate, perfluorocyclohexyl (meth)acrylate, di(perfluorocyclohexyl) fumarate, (meth)acrylonitrile, vinyl chloride, vinylidene chloride, vinyl fluoride, vinylidene fluoride, (meth)acrylamide, glycidyl (meth)acrylate, and also "Bisukôto" 3F, ditto 3FM, ditto 8F, ditto 8FM and ditto 17FM (all trade names of fluorine-containing vinyl monomers made by Osaka Yuki Kagaku KK), etc.

If these other vinyl monomers are employed in quantities less than 5% by weight, the molecular weight distribution of the vinyl type copolymers obtained becomes non-uniform, and if it exceeds 80% by weight, phase solubility of the vinyl type copolymer obtained and the silicone compound of component (B) is lowered and the external appearance tends to become poor. The vinyl type copolymer used as component (A) in compositions of the present invention is obtained using the aforementioned starting material components (i), (ii) and (iii), by copolymerization in the presence of a known polymerization initiator, for example azobisisobutyronitrile, benzoyl peroxide, t-butyl perbenzoate, t-butyl hydroperoxide, t-butyl peroctanoate, di-t-butyl peroxide or cumene hydroperoxide, etc., according to the usual methods. As component (B) in the present invention a silicone type compound represented by the general formula

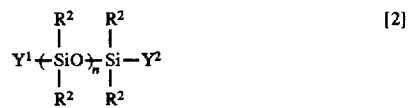

(in the formula, $y^1$, $y^2$, $R^2$ and n have the same meanings as previously) is used. Silicone type compounds represented by this general formula [2] are available, for example, as X-22-160AS, KF6001, KF6002, KF6003, X-22-170A, X-22-170B, X-22-170D, X-22-176B, X-22-176D, X-22-178A, X-22-178B, X-22-2809, X-22-4015, X-22-4039 (all products of Shinetsu Kagaku Kogyo KK), BY-16-848 (product of Toray Dow-Corning Silicone KK) and "Sairapurên" FM4411, ditto FM4421, ditto FM4425, ditto FM0411, ditto FM0421 and FM0425 (all products of Chisso KK), etc.

Preferred examples of hardening agents which allow reaction with hydroxyl groups which can be used as component (C) in the present invention include amino resins such melamine resins, benzoguanamine resins, urea resins and glycoluril resins, etc., or diisocyanates such as tolylene diisocyanate, diphenylmethane diisocyanate, hexamethylene diisocyanate, trimethylhexane diisocyanate, isophorone diisocyanate, methylcyclohexane-6,4- (or 2,6)-diisocyanate, methylene-4,4-bis(cyclohexylisocyanate), and 1,3-(isocyanatomethyl)cyclohexane, etc., their biuret, isocyanurate oradduct forms, and block isocyanates, etc., and polyisocyanate compounds, etc. As far as the proportions of each of the components in the compositions of the present invention, proportions of 40–90% by weight of the vinyl type copolymer of component (A), 0.5–20% by weight of the silicone type compound of component (B) and 10–60% by weight of the hardening agent of component (C), based on the total weight of the aforementioned component (A), component (B) and component (C), are desirable.

With a content of the said component (A) of less than 40% by weight, the flexibility of the hardened paint film is weakened, and more than 90% by weight is not desirable because the solvent resistance of the hardened paint film is lowered. Similarly, with a content of the said component (B) of less than 0.5% by weight the water-repellence and oil-repellence of the hardened paint film is prone not to persist for long periods in a natural environment; and more than 20% is undesirable because hardened paint films with adequate hardness are not readily obtained. Moreover, with a content of the said component (C) of less than 10% by weight, the water resistance of the hardened paint film is weakened, and more than 60% by weight is undesirable because the flexibility of the hardened paint film is lowered.

In paint compositions of the present invention, resins used in usual paints, for example acrylic resins, polyester resins, alkyd resins, fluorine resins, silicone resins, epoxy resins, polyurethane resins and fibrin type resins, etc., can be included within ranges which do not adversely affect the purpose of the present invention.

Paint compositions of the present invention can be made into paint by the usual methods, using equipment usually used in making paint; for example kneaders, roll mills, ball mills, sand mills and attrition mills, etc. In doing this, additives customarily used in prior paints, such as coloring agents such as pigments, dyes, glass flakes and aluminium flakes, pigment dispersants, viscosity regulating agents, levelling agents, hardening catalysts, gelling inhibitors, ultraviolet absorbing agents and free radical quenching agents, etc., can be added as required.

Paint compositions thus obtained can be painted by a usual painting method, for example air spray coating, airless spray coating, electrostatic coating or immersion coating, etc., onto a desired object to be coated, for example a metal or other inorganic material, or plastic or other organic material, and dried for the order of 1 minute to 3 days at a temperature in the range from normal temperature to 300° C., to obtain an excellent hardened paint film.

Next, the present invention will be explained by practical embodiments; but the present invention is not limited in any way by these embodiments.

PREPARATION EXAMPLE 1

Making an undercoat paint by copolymerizing styrene 150 parts by weight, methyl methacrylate 280 parts by weight, butyl methacrylate 400 parts by weight, 2-hydroxyethyl methacrylate 150 parts by weight and acrylic acid 20 parts by weight in xylene using azobisisobutyronitrile as the polymerization initiator, an acrylic resin solution with a heating residue of 50% by weight was obtained. Weight-average molecular weight by gel-permeation chromatography (as polystyrene) was 32,000.

An undercoating paint was made to the recipe below using this acrylic resin.

| | |
|---|---|
| Acrylic resin solution | 140 parts by weight |
| Amino resin solution[1] | 50 parts by weight |
| CAB resin solution[2] | 25 parts by weight |
| Titanium oxide[3] | 50 parts by weight |
| UV absorber solution[4] | 10 parts by weight |
| Photostabilizer solution[5] | 5 parts by weight |
| Levelling agent solution[6] | 3 parts by weight |

Notes)
1) Mitsui Toatsu Kagaku product Yuban 20SE (butylated melamine resin)
2) Eastman-Kodak product CAB381-2 (cellulose acetate/butyrate resin), 20 wt % butyl acetate solution
3) Ishihara Sangyo product eR-80
4) Ciba-Geigy product Tinuvin 900, 10 wt % xylene solution
5) Sankyo product "Sanôru" LS292, 20 wt % xylene solution
6) Monsanto product Modaflo, 20 wt % xylene solution This undercoat paint was then diluted using a thinner made up of toluene 50% by weight, butyl acetate 30% by weight and isobutyl alcohol 20% by weight, to a viscosity of 13 sec with Ford cup No. 4 (20° C.).

PREPARATION EXAMPLE 2

Making vinyl type copolymers Xylene 485 parts was put into a 4-mouthed flask fitted with a thermometer, reflux cooler and dropping funnel, and held at reflux temperature. Then, a mixture of monomers and a polymerization initiator as listed in Table 1 was added dropwise at even speed over 2 hours. After holding at reflux temperature for a further 1 hour after completing the addition, the follow-up catalyst was added; and by holding at reflux temperature for 2 hours, vinyl type copolymers A-1 to A-6 with the properties listed in Table 1 were obtained.

TABLE 1

| Type of vinyl type copolymer | | A-1 | A-2 | A-3 | A-4 | A-5 | A-6 |
|---|---|---|---|---|---|---|---|
| Properties of each component | | | | | | | |
| Vinyl monomer mixture (parts by weight) | "Sairapurên" FM0711[1] | — | — | 100 | 150 | — | — |
| | "Sairapurên" FM0721[1] | — | 50 | — | — | 225 | — |
| | "Sairapurên" FM0725[1] | 15 | — | — | — | — | — |
| | Methylmethacrylate | 80 | 200 | 110 | — | 50 | 125 |
| | Styrene | 150 | 150 | 150 | 150 | 150 | 150 |
| | Butyl actylate | 180 | 45 | — | — | — | 140 |
| | 2-Hydroxyethyl methacrylate | 65 | 45 | 130 | 190 | 65 | 65 |
| | Acrylic acid | 10 | 10 | 10 | 10 | 10 | 10 |
| Polymerization initiator | t-Butyl perbenzoate | 5 | 5 | 5 | 5 | 5 | 5 |
| Follow-up catalyst (parts wt.) | t-Butyl perbenzoate | 2 | 2 | 2 | 2 | 2 | 2 |
| | Xylene | 8 | 8 | 8 | 8 | 8 | 8 |
| Silicone type vinyl monomer (wt %) | | 3 | 10 | 20 | 30 | 45 | — |
| Hydroxyl-group-containing vinyl monomer (wt %) | | 13 | 9 | 26 | 38 | 13 | 13 |
| Properties of the copolymer solution | Heating residue (wt %) | 50 | 50 | 50 | 50 | 50 | 50 |
| | Gardner viscosity (25° C.) | O-P | K | M-N | R | K-L | N |

Notes. [1]"Sairapurên" FM0711–FM0725: silicone type vinyl monomers having a structure of general formula [1], made by Chisso KK.

EMBODIMENTS 1-7; COMPARISON EXAMPLES 1, 2

Paint solutions were prepared using the vinyl type copolymers obtained in Preparation Example 2 and crosslinking agents, etc., by mixing in the proportions shown in Table 2, and diluting using Solbase #100/butyl acetate (weight ratio 7:3) to a viscosity of 25 seconds with Ford cup No. 4 (20° C.).

Then Aqua No. 4200 (an electrodeposition paint product made by Nihon Yushi) was painted onto zinc-phosphate-treated sheet steel to give a dry film thickness of 20 μm, and after hardening at 175° C. for 20 minutes, "Haiepiko" No. 100 White (a medium-stain paint product made by Nihon Yushi) was painted to give a dry film thickness of 40 μm, and hardened at 140° C. for 20 minutes. Then, after painting the undercoat paint of Preparation Example 1 onto this paint film by air spraying to give a dry film thickness of 15 μm, and setting for 3 minutes at room temperature, the respective paint solutions in Table 2 were painted by air spraying, and hardened at 140° C. for 20 minutes to obtain the test pieces.

The test pieces obtained were investigated for paint film performance.

TABLE 2

| Ingredients of the paint composition (Parts by weight) | Embodiment 1 | Embodiment 2 | Embodiment 3 | Embodiment 4 | Embodiment 5 | Embodiment 6 | Embodiment 7 | Comparison Example 1 | Comparison Example 2 |
|---|---|---|---|---|---|---|---|---|---|
| Vinyl type copolymer solution | | | | | | | | | |
| A-1 | 138.0 | — | — | — | — | — | — | — | — |
| A-2 | — | 160.0 | — | — | — | 134.0 | — | — | — |
| A-3 | — | — | 134.0 | — | — | — | — | 150.0 | — |
| A-4 | — | — | — | 130.0 | — | — | 80.0 | — | — |
| A-5 | — | — | — | — | 90.0 | — | — | — | — |
| A-6 | — | — | — | — | — | — | — | — | 90.0 |
| Silicone type compound[1] | | | | | | | | | |
| KF6002 | 1.0 | — | — | — | — | — | — | — | — |
| X-22-160AS | — | 5.0 | — | — | — | — | — | — | — |
| X-22-176B | — | — | 5.0 | — | — | — | — | — | — |
| X-22-170A | — | — | — | 10.0 | — | — | — | — | — |
| FM4411 | — | — | — | — | 15.0 | — | 10.0 | — | 15.0 |
| BY16-848 | — | — | — | — | — | 5.0 | — | — | — |
| Hardening agent[2] | | | | | | | | | |
| Yuban 20SE | 50.0 | — | — | — | 66.7 | — | — | — | 66.7 |
| Cymel 303 | — | 15.3 | — | 25.5 | — | — | 51.0 | 25.5 | — |
| Coronate EH | — | — | 28.0 | — | — | 28.0 | — | — | — |
| Ultraviolet absorbing agent solution[3] | 10.0 | 10.0 | 10.0 | 10.0 | 10.0 | 10.0 | 10.0 | 10.0 | 10.0 |

TABLE 2-continued

| Ingredients of the paint composition (Parts by weight) | Embodiment 1 | Embodiment 2 | Embodiment 3 | Embodiment 4 | Embodiment 5 | Embodiment 6 | Embodiment 7 | Comparison Example 1 | Comparison Example 2 |
|---|---|---|---|---|---|---|---|---|---|
| Photostabilizer solution[4] | 5.0 | 5.0 | 5.0 | 5.0 | 5.0 | 5.0 | 5.0 | 5.0 | 5.0 |
| Hardening catalyst[5] | — | 2.0 | — | 2.0 | — | — | 2.0 | 2.0 | — |
| Levelling agent[6] | 2.0 | 2.0 | 2.0 | 2.0 | 2.0 | 2.0 | 2.0 | 2.0 | 2.0 |

Notes.
[1]
KF6002: silicone type compound with hydroxyl groups at both ends, product of Shinetsu Kagaku KK; hydroxyl group value = 35.
X-22-160AS: silicone type compound with hydroxyl groups at both ends, product of Shinetsu Kagaku KK; hydroxyl value = 112
X-22-176B: silicone type compound with a hydroxyl group at one end, product of Shinetsu Kagaku KK; hydroxyl value = 50
X-22-170A: silicone type compound with a hydroxyl group at one end, product of Shinetsu Kagaku KK; hydroxyl value = 31
FM4411: silicone type compound with hydroxyl groups at both ends, product of Chisso KK; product name "Sairapurên" FM4411; molecular weight = 1000
BY-16-848: silicone type compound with hydroxyl groups at both ends product of Toray Dow-Corning Silicone; hydroxyl group equivalent weight = 650
[2]
Yuban 20SE: butylated melamine resin solution product made by Mitsui Toatsu Kagaku KK; heating residue = 60 wt %.
Cymel 303: methylated melamine resin product made by Mitsui Cyanamid KK; heating residue 98 wt %.
Coronate EH: hexamethylene diisocyanate iso-cyanurate product made by Nihon Polyurethane Kogyo KK; isocyanate content = 21 wt %.
[3]UV absorber: 10 wt % xylene solution of Tinuvin 900, product of Ciba-Geigy.
[4]Photostabilizer solution: 20 wt % xylene solution of "Sanôru" 292, product of Sankyo KK.
[5]Hardening catalyst solution: 20 wt % isopropanol solution of p-toluenesulfonic acid
[6]Levelling agent: 20 wt % xylene solution of Modaflo, product of Monsanto.

TABLE 3

| | Embodiment 1 | Embodiment 2 | Embodiment 3 | Embodiment 4 | Embodiment 5 |
|---|---|---|---|---|---|
| Resin components | | | | | |
| (A) Vinyl type copolymer — Type | A-1 | A-2 | A-3 | A-4 | A-5 |
| Silicone type vinyl monomer (wt %) | 3 | 10 | 20 | 30 | 45 |
| (B) Silicone type compound | KF6002 | X-22-160AS | X-22-176B | X-22-170A | FM4411 |
| (C) Hardening agent | Yuban 20SE | Cymel 303 | Coronate EH | Cymel 303 | Yuban 20SE |
| Mixing ratio (Weight ratio) — Component (A) | 69 | 80 | 67 | 65 | 45 |
| Component (B) | 1 | 5 | 5 | 10 | 15 |
| Component (C) | 30 | 15 | 28 | 25 | 40 |
| Paint film performance | | | | | |
| Water repellence — Contact angle (initial)[1] | 92 | 98 | 100 | 102 | 105 |
| Contact angle (after exposure)[2] | 91 | 97 | 100 | 101 | 103 |
| Oil repellence — Contact angle (initial)[3] | 63 | 65 | 66 | 66 | 67 |
| Contact angle (after exposure)[4] | 62 | 63 | 64 | 66 | 65 |
| Resistance to soiling[5] | ○ | ○ | ○ | ○ | ○ |
| Lead pencil hardness | H | F | F | HB | HB |
| Solvent resistance[6] | No abnormality | No abnormality | No abnormality | No abnormality | No abnormality |
| 60° Mirror surface gloss | 93 | 92 | 94 | 93 | 94 |

TABLE 4

| | Embodiment 6 | Embodiment 7 | Comparison Example 1 | Comparison Example 2 |
|---|---|---|---|---|
| Resin components | | | | |
| (A) Vinyl type copolymer — Type | A-3 | A-4 | A-4 | A-6 |
| Silicone type vinyl monomer (wt %) | 20 | 30 | 30 | — |
| (B) Silicone type compound | BY16-848 | FM4411 | — | FM4411 |
| (C) Hardening agent | Coronate EH | Cymel 303 | Cymel 303 | Yuban 20SE |
| Mixing ratio (Weight ratio) — Component (A) | 67 | 40 | 75 | 45 |
| Component (B) | 5 | 10 | — | 15 |
| Component (C) | 28 | 50 | 25 | 40 |
| Paint film performance | | | | |
| Water repellence — Contact angle (initial)[1] | 101 | 103 | 102 | 103 |
| Contact angle (after exposure)[2] | 100 | 103 | 78 | 90 |

TABLE 4-continued

|  |  | Embodiment 6 | Embodiment 7 | Comparison Example 1 | Comparison Example 2 |
|---|---|---|---|---|---|
| Oil repellence | Contact angle (initial)[3] | 65 | 66 | 65 | 63 |
|  | Contact angle (after exposure)[4] | 64 | 65 | 20 | 41 |
| Resistance to soiling[5] |  | O | O | X | Δ |
| Lead pencil hardness |  | F | F | HB | HB |
| Solvent resistance[6] |  | No abnormality | No abnormality | No abnormality | Slight solution |
| 60° Mirror surface gloss |  | 92 | 93 | 94 | 15 |

Notes
[1] Contact angle (initial): Contact angle of the untreated paint film with pure water
[2] Contact angle (after exposure): Contact angle of the paint film with pure water after 1500 hours testing in a sunshine weatherometer.
[3] Contact angle (initial): Contact angle of the untreated paint film with dodecane
[4] Contact angle (after exposure): Contact angle of the paint film with dodecane after 1500 hours testing in a sunshine weatherometer.
[5] Resistance to soiling: Assessed visually after outdoor exposure for 6 months
O No adhering dirt
Δ Adhering dirt prominent
X Considerable adhering dirt
[6] Solvent resistance: Visual assessment of the state of the paint film after rubbing 20 times with gauze permeated with xylene.

From the results above, it is evident that the paint compositions of the present invention give hardened paint films the water-repellence and oil-repellence of which is not lowered even when they are exposed for long periods under conditions of accelerated weathering.

By contrast, with Comparison Example 1, although initial water-repellence and oil-repellence were excellent there were considerable decreases in both after the accelerated weather-resistance test, and soiling resistance after outdoor exposure was also weak, because it did not contain a silicone compound of component (B).

Similarly, with Comparison Example 2, phase solubility of component (A) and component (B) was lowered because it did not contain silicone type vinyl monomer units in component (A); 60° gloss and solvent resistance of the paint film were weak, and resistance to soiling was also inadequate.

The paint compositions of the present invention offer hardened paint films the water-repellence and oil-repellence of which is not lowered by exposure for long periods in a natural environment, because silicone type compounds can be fixed permanently in the paint film surface by crosslinking, with good phase solubility.

We claim:

1. Paint composition comprising (A) a vinyl type copolymer obtained by polymerizing
   (i) 1–50% by weight of a silicone type vinyl monomer represented by the general formula

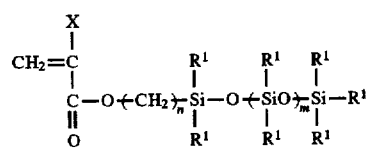

in the formula X is a hydrogen atom or a methyl group, $R^1$ is a methyl group or a phenyl group, k is a number 1–5, and m is a number 3–150

(ii) 5–60% by weight of a vinyl monomer containing a hydroxyl group, and (iii) 5–80% by weight of another vinyl monomer, (B) a silicone compound represented by the general formula

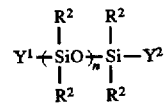

[2]

in the equation either one of $Y^1$ and $Y^2$ is a hydroxyl group and the remaining one is a hydroxyl group or a methyl group; $R^2$ is a methyl group or a phenyl group, and n is a number 3–150, and (C) a hardening agent which allows reaction with hydroxyl groups.

2. Paint composition according to claim 1, in which the hardener of component (C) is selected from the group consisting of an amino resin, a polyisocyanate compound and a polyalkoxysilane compound.

3. Paint composition according to claim 1 or claim 2 in which component (A) is 40–90% by weight, component (B) is 0.5–20% by weight, and component (C) is 10–60% by weight, based on the total weight of component (A), component (B) and component (C).

* * * * *